United States Patent
Laursen et al.

(10) Patent No.: US 11,075,922 B2
(45) Date of Patent: Jul. 27, 2021

(54) DECENTRALIZED METHOD OF TRACKING USER LOGIN STATUS

(71) Applicant: Oracle International Corporation, Redwood Shores, CA (US)

(72) Inventors: Darrel Laursen, Pleasanton, CA (US); Wellen Lau, Danville, CA (US)

(73) Assignee: Oracle International Corporation, Redwood Shores, CA (US)

( * ) Notice: Subject to any disclaimer, the term of this patent is extended or adjusted under 35 U.S.C. 154(b) by 214 days.

(21) Appl. No.: 15/872,540

(22) Filed: Jan. 16, 2018

(65) Prior Publication Data

US 2019/0222582 A1 Jul. 18, 2019

(51) Int. Cl.
*H04L 29/06* (2006.01)
*H04L 29/08* (2006.01)

(52) U.S. Cl.
CPC .......... *H04L 63/108* (2013.01); *H04L 63/068* (2013.01); *H04L 67/146* (2013.01); *H04L 67/02* (2013.01)

(58) Field of Classification Search
CPC ... H04L 63/108; H04L 63/068; H04L 67/146; H04L 67/02
USPC .......................................................... 726/4
See application file for complete search history.

(56) References Cited

U.S. PATENT DOCUMENTS

| | | | |
|---|---|---|---|
| 5,943,478 A | 8/1999 | Aggarwal et al. | |
| 6,073,241 A | 6/2000 | Rosenberg et al. | |
| 6,912,582 B2 | 6/2005 | Guo et al. | |
| 7,188,181 B1 | 3/2007 | Squier et al. | |
| 7,788,376 B2* | 8/2010 | Tom | G06Q 20/3674 709/225 |
| 8,276,190 B1* | 9/2012 | Chang | H04L 63/0815 713/176 |
| 8,533,786 B2* | 9/2013 | Chabbewal | H04L 63/1466 726/4 |
| 8,719,899 B2 | 5/2014 | Toomey et al. | |
| 8,763,152 B2 | 6/2014 | Vernal et al. | |
| 8,793,595 B2 | 7/2014 | Appelman | |
| 9,015,255 B2* | 4/2015 | Duterque | G06Q 30/0201 709/206 |
| 9,088,559 B2 | 7/2015 | Ma et al. | |
| 9,386,007 B2* | 7/2016 | Minov | H04L 63/062 |
| 2005/0204148 A1* | 9/2005 | Mayo | H04L 63/0815 713/185 |

(Continued)

FOREIGN PATENT DOCUMENTS

WO 2016179348 A1 11/2016

OTHER PUBLICATIONS

"Application Usage Analytics" Log Management Made Easy | Logentries, accessed on the web at: http://www.logentries.com/insights/application-usage-analytics/, 2017.

(Continued)

*Primary Examiner* — Dereena T Cattungal
(74) *Attorney, Agent, or Firm* — Kilpatrick, Townsend and Stockton LLP

(57) ABSTRACT

Systems and methods can track user login statuses across independent systems to determine whether to automatically grant access to a given domain. Specifically, when a new user device is detected at a system, one or more cookies are used to facilitate inter-system communications and to track session characteristics.

17 Claims, 4 Drawing Sheets

(56) References Cited

U.S. PATENT DOCUMENTS

| | | | |
|---|---|---|---|
| 2006/0230265 A1* | 10/2006 | Krishna | H04L 63/0281 713/158 |
| 2007/0150603 A1* | 6/2007 | Crull | H04L 63/08 709/227 |
| 2008/0270527 A1* | 10/2008 | Krabach | H04L 67/02 709/203 |
| 2009/0055908 A1* | 2/2009 | Rapoport | H04L 63/0815 726/6 |
| 2009/0193129 A1* | 7/2009 | Agarwal | H04L 63/0281 709/229 |
| 2009/0249440 A1* | 10/2009 | Platt | H04L 63/20 726/1 |
| 2010/0024015 A1 | 1/2010 | Hardt | |
| 2011/0078437 A1* | 3/2011 | Reddy | H04L 63/0815 713/155 |
| 2012/0210413 A1* | 8/2012 | Akula | H04L 63/0815 726/8 |
| 2013/0179489 A1* | 7/2013 | Daley | H04L 67/2828 709/203 |
| 2013/0212665 A1* | 8/2013 | Goyal | G06F 21/41 726/8 |
| 2014/0282940 A1* | 9/2014 | Williams | H04L 63/10 726/6 |
| 2014/0283139 A1* | 9/2014 | Anand | G06F 21/54 726/30 |
| 2015/0134956 A1* | 5/2015 | Stachura | H04L 63/0807 713/168 |
| 2015/0350106 A1* | 12/2015 | Whalley | H04L 47/803 709/225 |
| 2016/0105314 A1* | 4/2016 | Logue | H04L 12/2818 726/4 |
| 2016/0248757 A1* | 8/2016 | Williams | H04L 63/0815 |
| 2017/0366547 A1* | 12/2017 | Goldfarb | H04L 63/08 |

OTHER PUBLICATIONS

Iverson, Dan, "Understanding the Check Token ID in People Tools 8.56", retrieved from internet: http://psadmin.io/2017/10/25/understandi ng-the-check-toke11-id-i 11-peopletool s-8-56/, Oct. 25, 2017, 9 pages.

* cited by examiner

DECENTRALIZED METHOD OF TRACKING USER LOGIN STATUS

FIELD

Embodiments relate to tracking user login statuses across independent systems. Specifically, when a new user device is detected at a system, one or more cookies are used to facilitate inter-system communications and to track session characteristics.

BACKGROUND

Various online content is restricted. For example, the content may include financial, personal, medical or other confidential information that pertains to a specific individual. One strategy for restricting access to content is to condition access on validation of login data provided by individual devices. Once login data received from a device has been validated, a web server may permit the device to access content on one or more webpages on a web site, though typically this access is also limited. For example, the access may be authorized only while a same browser at the device is being used, only for a defined time period, only so long as an interaction between the device and the web site is detected at at least a predefined time period, etc.

In some instances, a web server uses a cookie to determine whether a login status for a given user device is active. When the status is active, access to a web site can be granted, even if a user had intermittently navigated to another site or closed a browser. However, this technique relies upon server-side tracking of cookie data. Thus, it is frequently limited to a particular domain system. When a user requests access to restricted content on another domain, another login validation is required. The additional login interaction can annoy users, which can reduce traffic to a site. Further, the additional login validation can consume additional server-side resources.

SUMMARY

In some embodiments, systems and methods are provided for determining whether to authorize a user device to access a gated domain. A first communication that corresponds to a first request to access a particular domain can be received at a domain system from a user device. The first communication can include one or more cookies. Access data can be extracted from the one or more cookies. The access data can identify a recently accessed domain system. Each of the domain system and the recently accessed domain system can be within a distributed system. The recently accessed domain system can be one that hosts one or more first gated webpages on another domain. The domain system can be one that hosts one or more second gated webpages on the particular domain. A second communication can be transmitted from the domain system and to the recently accessed domain system. The second communication can correspond to a second request for login state data that indicates whether the one or more cookies corresponds to an active login at the other domain. The second communication can include at least part of the one or more cookies. Particular login state data can be received at the domain system and from the recently accessed domain system. The particular login state data can indicate that the one or more cookies corresponds to an active login at the other domain. In response to receiving the particular login state data, the user device can be authorized to access a webpage of the one or more second gated webpages on the particular domain.

BRIEF DESCRIPTION OF THE DRAWINGS

Illustrative embodiments of the present invention are described in detail below with reference to the following drawing figures.

DESCRIPTION

Some embodiments of the invention provide an approach to track login statuses throughout a distributed system using one or more cookies. In some embodiments, a user device sends an access request (e.g., HTML request) to a particular system that is hosting webpages on a particular domain. The access request (or an associated communication) can include a one or more cookies. A first cookie can identify a previously accessed system within the distributed system, such that the particular system can initiate communication with the previously accessed system. A second cookie can include identifying information, which can include a session cookie, identifier of the user device and/or identifier of a session. The particular system can send the identifying information to the recently accessed system and request a login status for the user device. The recently accessed system can use the identifying information to retrieve cookie data on its data store, which indicates whether the one or more cookies is indicative of the user device being associated with a currently active login status. The recently accessed system can transmit the status information to the particular system, which can then determine whether to authorize content access (e.g., if the login status is active) or to require a valid login (e.g., if the login status is inactive).

Figure 1:
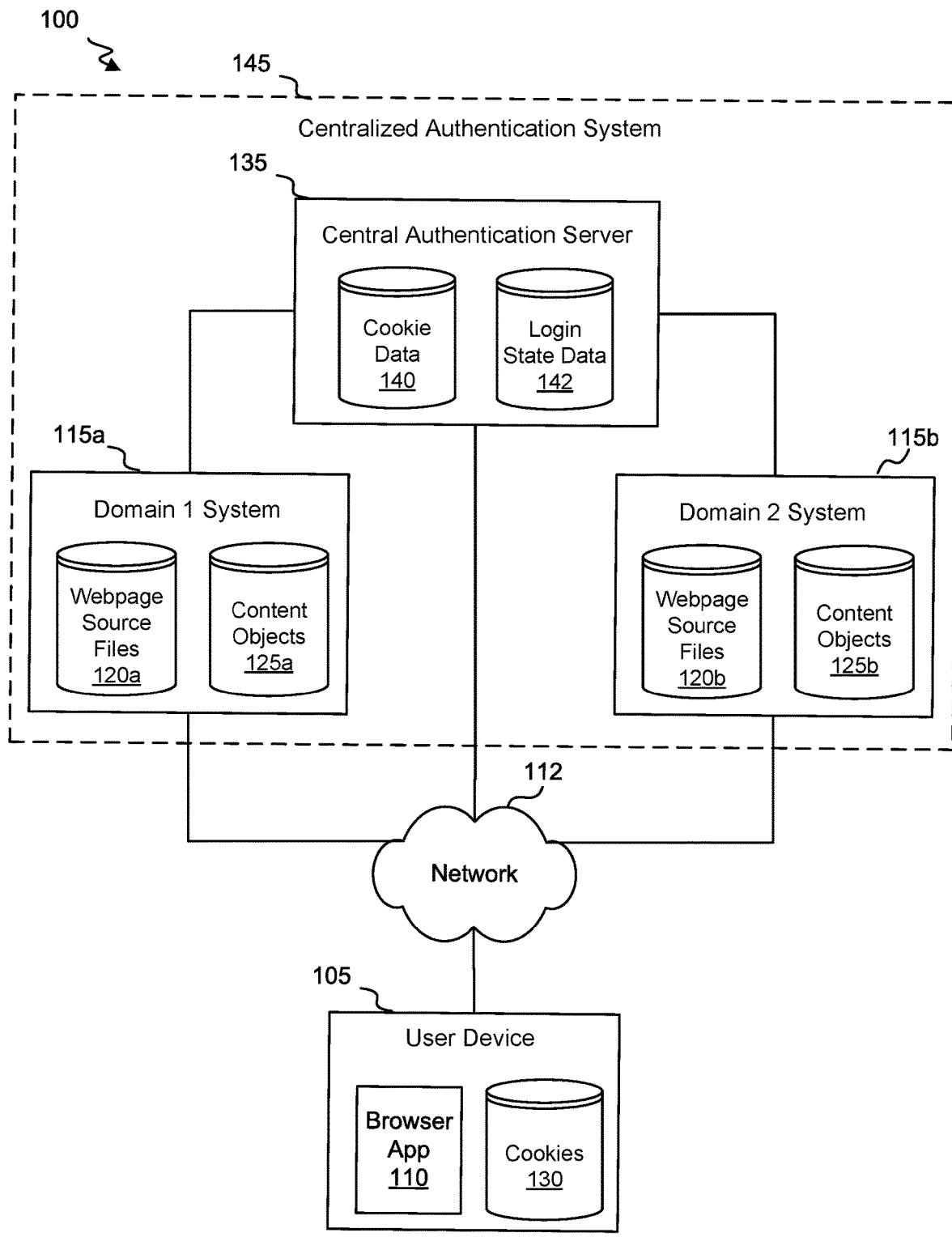
FIG. 1 shows an example of an interaction system for using a centralized authentication system to authenticate user devices for domain access.

FIG. 1 shows an example of an interaction system 100 for using a centralized authentication system to authenticate user devices for domain access. In this instance, a browser application 105 at a User Device 110 transmits a communication corresponding to a login request over a network 112 (e.g., the Internet) to Domain 1 System 115a. Domain 1 System 115a may include a web server that hosts webpages on a first domain. The communication may (for example) correspond to a public user signon, such that the login occurs without presenting a login page. In some instances, the communication includes login credentials (e.g., a username and password) that are identified based on user input or automatically identified (e.g., via posted form variables).

Upon validating the login, Domain 1 System 115a grants User Device 105 access to webpages on the first domain. Accordingly, in response to various requests received from user device 105, Domain 1 System 115a retrieves responsive webpage source files from a webpage source file data store 120a and/or responsive content objects from a content object data store 125a and transmits the webpage source files and/or content objects to user device 105.

Domain 1 System 115a can also transmit one or more cookies to User Device 105, which can store the one or more cookies in a cookie data store 130. The one or more cookies can include, for example, a session cookie that includes an identifier of a session associated with the interaction between User Device 105 and Domain 1 System 115a. The session cookie may also include an expiration time (or duration) for the session. Domain 1 System 115a can also transmit the one or more cookies to a central authentication server 135, which can store the one or more cookies in a cookie-data data store 140. Notably, central authentication server 135 can be (in various embodiments) in front or behind Domain 1 System 115a and Domain 2 System 115b.

Domain 1 System 115a can further update login information to reflect that User Device 105 is currently logged into the first domain. The update can be local or remote. For example, Domain 1 System 115a can transmit a communication corresponding to an indication User Device 105 is actively logged in to Central Authentication Server 135. Central Authentication Server 135 can then store corresponding login-state data in a login state data data store 142. For example, the login-state data may include an identifier of User Device 105, an indication as to whether the device is logged in or logged out of the first domain, an identification of the first domain, an identification of Domain 1 System 115a, a present time, a login time, a logout time and/or an expiration time.

Cookie data may be linked to login data. For example, a data element in cookie data may include an identifier (e.g., of a device, session, etc.) may further be included in a corresponding data element in the login state data. In some instances, a single data store includes the cookie data and login data (e.g., such that one or more cookies are associated with login state information).

In some instances, Domain 1 System 115a can detect one or more events associated with User Device 105 that indicate that a login state is to be changed. For example, an event corresponding to a logout may corresponding to reaching a logout time or receipt of a logout action. In response to the event, Domain 1 System 115a may update login data and/or cookie data associated with User Device 105 (e.g., by changing login data to reflect a "Logged Out" status, deleting a data element indicating that User Device 105 is logged in, clearing the session cookie or updating a status variable in the session cookie to indicate an inactive status). As another example, an expiration time can be extended upon detecting maintained interaction with the web site. Domain 1 System 115a can communicate each update to Central Authentication Server, which can update the cookie data and/or login data accordingly (e.g., by extending or resetting an expiration time). In some instances, Domain 1 System 115a also transmits an updated cookie to User Device 105.

User Device 105 can then request a webpage from a Domain 2 System 115b. Domain 2 System 115b may include a web server that hosts webpages on a second domain. Each of Domain 1 System 115a, Domain 2 System 115b and Central Authentication Server 135 can be a part of a centralized authentication system 145. The request may include the one or more cookies (and/or the updated cookie). Upon receiving the request, Domain 2 System 115b can transmit a communication to Central Authentication Server 135 that corresponds to a request for status data. The communication may include (for example) the one or more cookies (and/or the updated cookie) and/or device information pertaining to User Device 105 (e.g., a device identifier).

Central Authentication Server 135 can then retrieve corresponding stored login data (that corresponds to the cookie data) and determine whether a login status of User Device 105 in Centralized Authentication System 130 is active. In this example, Domain 1 System 115a is the system with which User Device 105 most recently interacted, such that the login status at Centralized Authentication System 130 equates to the login status at Domain 1 System 115a, which is reflected in the login state data stored at login state data store 142. The login status may be determined (for example) directly from the cookie data (e.g., which may indicate that the user has been logged out of Domain 1 System 115a) and/or based on an assessment of the cookie data (e.g., by determining whether a current time exceeds a session expiration time identified in the cookie data).

Central Authentication Server 135 communicates the login status to Domain 2 System 115b. When the login status is inactive, Domain 2 System 115b can condition access upon validation of login credentials. For example, Domain 2 System 115b can transmit a login webpage that includes one or more fields to receive login credentials to User Device 105. When the login status is active, Domain 2 System 115a can grant access to webpages (e.g., by transmitting one or more webpage source files from a webpage source file data store 120b and/or one or more content objects from a content object data store 125b) without requiring User Device 105 to provide login credentials.

When access is granted by Domain 2 System 115b, Domain 2 System 115b can generate one or more new or updated cookies and/or update login-state data that reflect that User Device 105 is actively logged into Domain 2 System 115b. The one or more new or updated cookies can be transmitted to User Device 105 (which can store the one or more new or updated cookies in cookie data store 130). Further, cookie data for the one or more new or updated cookies can be transmitted to Central Authentication Server, which can update the cookie data at cookie data data store 140 accordingly.

Thus, in this example, Central Authentication Server 135 manages data such that current login statuses can be determined across domains for specific devices. This central management can facilitate reduced log-in requirements across related sites. This may be particularly useful when the domains are integrated into various online interfaces and/or user experiences.

However, such centralized management is not always feasible. In some instances, individual domain systems separately track login statuses and do not routinely communicate such statuses to a central server or database. These distributed systems can be associated with reduced costs and complexity by avoiding the need to operate a dedicated central data store and coordinate repeated communications to and from the central data store.

Figure 2:
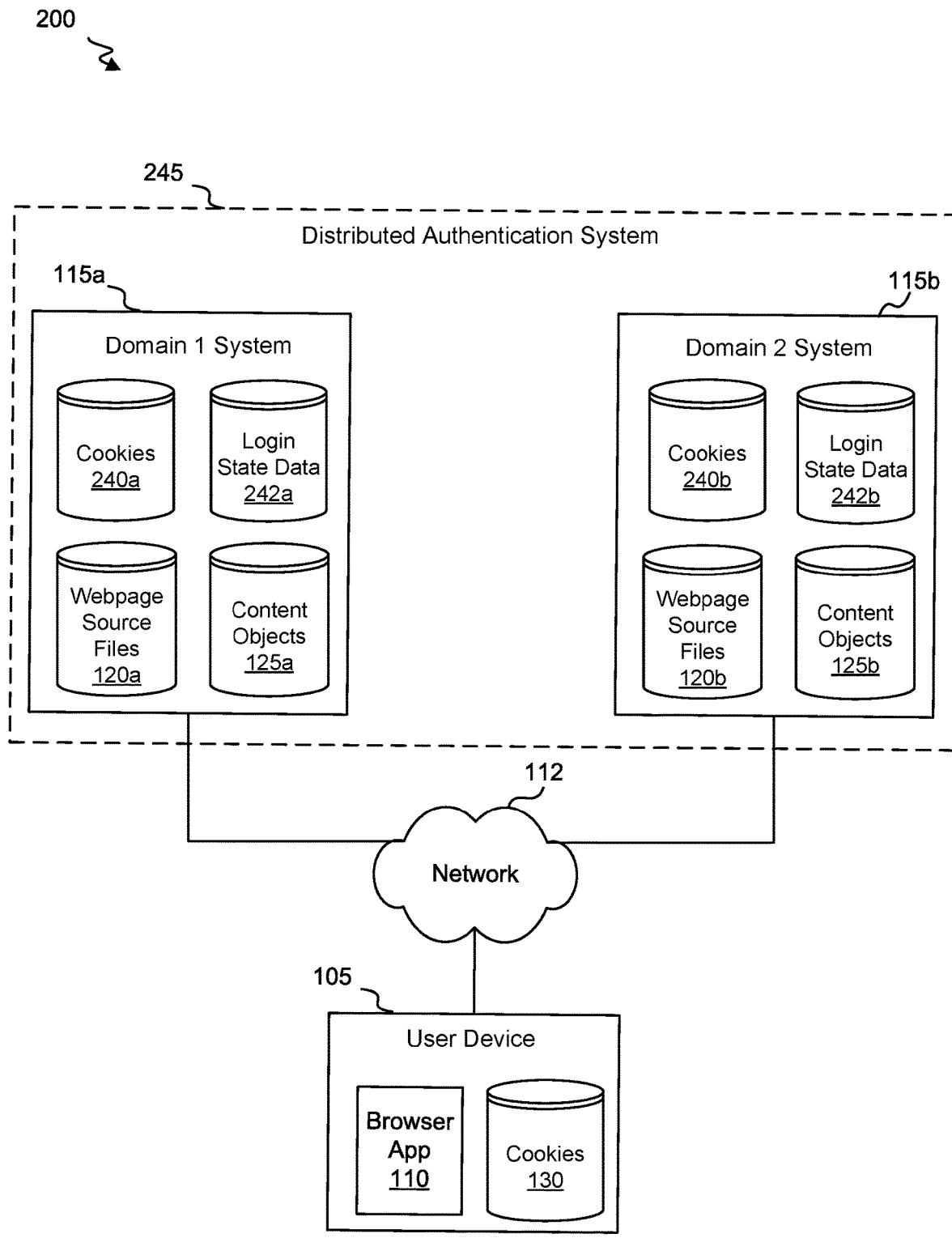
FIG. 2 shows an example of an interaction system for using a distributed authentication system to authenticate user devices for domain access.

FIG. 2 shows an example of an interaction system 200 for using a distributed, decentralized authentication system to authenticate user devices for domain access. In this instance, browser application 105 at User Device 110 transmits login information over a network 112 (e.g., the Internet) to Domain 1 System 115a. Upon validating the login information, Domain 1 System 115a grants User Device 105 access to webpages on the domain. Accordingly, in response to various requests received from user device 105, Domain 1 System 115a retrieves responsive webpage source files from webpage source file data store 120a and/or responsive content objects from content object data store 125a and transmits the webpage source files and/or content objects to user device 105. Domain 1 System 115a transmits one or more cookies to User Device 105, which can store the one or more cookies in a cookie data store 130. The one or more cookies may include a token cookie that identifies a user device, preferred language and/or time at which the token cookie was generated. The token cookie can be managed such that it is to be issued to a particular browser at a particular user device at signon and is to be deleted from the particular browser at the particular user device at logout. The one or more cookies may include a domain or site cookie that identifies a domain, web site, URL, address and/or other identifier associated with Domain 1 System. The one or more cookies may include a session cookie that includes an identifier of a session with Domain 1.

Unlike the instance corresponding to FIG. 1, Domain 1 System 115a need not transmit the one or more cookies to a central authentication server. Rather Domain 1 System 115a stores the one or more cookies in a locally managed cookie data store 240a and stores the login status in a locally managed login status data store 242a.

As in the example corresponding to FIG. 1, Domain 1 System 115a can update the one or more cookies and/or login information based on events associated with User Device 105. For example, in response to receiving a communication from User Device 105 indicative of an express log-out event, Domain 1 System 115a can delete a token cookie that is associated with User Device 105 and update a login status as indicating that the User Device 105 is not associated with an active login (e.g., by identifying an expiration time, deleting an active login indicator, and/or including a logged-out indicator). A browser associated with the communication or the token cookie can be updated to indicate that a logout occurred at a given time. As another example, an expiration time in a session cookie can be extended upon detecting maintained interaction with the web site.

However, rather than communicating each update to a central server, Domain 1 System 115a updates locally managed cookie data store 240a and locally managed login status data store 242a (or a combined data store) to reflect the updates. In some instances, Domain 1 System 115a also transmits the updated cookie(s) and/or a cookie-management instruction (e.g., to delete a token cookie and/or session cookie) to User Device 105.

User Device 105 can then request a webpage from a Domain 2 System 115b. In the FIG. 2 embodiment, each of Domain 1 System 115a and Domain 2 System 115b can be a part of a distributed authentication system 245. It will be appreciated that, while only two domain systems are shown, more domain systems may be present in distributed authentication system. The request may include the one or more cookies (and/or the updated cookie(s)).

Domain 2 System 115b can query its login status data store 242b and/or cookies data store 240b to determine whether there is any matching data that indicates that the browser at User Device 105 is logged into Domain 2 System 115b. In this example, no match is found. Domain 2 System 115b them assesses the request from User Device 105 to determine whether it includes identifying information (e.g., whether it includes a token cookie), such that Domain 2 System 115b can request specific login statuses from one or more other domain systems. In this instance, the request does include the token cookie.

Domain 2 System 115b can identify Domain 1 System 115a as having been recently accessed based on the domain or site cookie and/or login status. Domain 2 System 115b can perform the validity of the site by (for example) determining whether all or part the cookie value identifying the domain or site matches at least part (or all) one or more URIs or domains on a predefined white list.

Domain 2 System 115b can transmit a communication to Domain 1 System 115a that corresponds to a request for status data. The communication may include (for example) one or more cookies or updated cookies (e.g., the token cookie, the session cookie, and/or the domain or site cookie), a request or command to provide status information (e.g., "?cmd=checktoken"), and/or an identification of one or more algorithms (e.g., to produce and confirm a signature and/or to hash a shared secret to ensure that Domain 1 System 115a is a valid responder for login coordination).

Domain 1 System 115a can query cookies data store 240a for cookie data that matches data in the one or more cookies (e.g., matching data from a token cookie and/or session cookie). For example, Domain 1 System 115a can query cookies data store 240a to identify a session object that includes data matching that from a session cookie. If the session object is identified, Domain 1 System 115a can determine whether identifying information in the session object matches that from the one or more cookies (e.g., whether a token cookie identified in the session cookie matches a token cookie in the one or more cookies). In some instances (e.g., when cookie data is not deleted upon an expiration or log out), additional processing of the cookie data can be performed to determine whether a session is active. For example, Domain 1 System 115a can identify login information that corresponds to the matching cookie data.

If no match is found for the one or more cookies, Domain 1 System 115a can generate a response variable indicating that the one or more cookies are not associated with an active login. A same or similar response variable can be generated if a match is found but the matching cookie data indicates that a login has expired or that a logout occurred for another reason (e.g., in response to a logout request from User Device 105). A negative response variable can also be generated if (for example) a site identified in a cookie is an illegal or invalid site name, Domain 1 System 1 determines that the token cookie has an invalid format, etc. If a match is found for the one or more cookies (e.g., and Domain 1 System 115a determines that it is authoritative for responding to the login-status request and/or determines that retrieved data is indicative of an active login), a positive response variable is generated indicating that the one or more cookies are associated with an active login Domain 1 System 115a can transmit a response communication to Domain 2 System 115b that includes the response variable. The response communication may also include a signature (e.g., generated in accordance with an algorithm as identified in the Domain-2-System communication). In some instances, instead of or in addition to including the response variable, the response communication can include a result of the query. Thus, if no match is found, an empty cookie data set or null result can be returned, and if a match is found, the matching cookie(s) can be returned.

When the response communication indicates that the one or more cookies are associated with an active login status (e.g., via a positive response variable), Domain 2 System 115a can grant access to webpages (e.g., by transmitting one or more webpage source files from a webpage source file data store 120b and/or one or more content objects from a content object data store 125b) without requiring User Device 105 to provide login credentials. Otherwise (e.g., when the response communication includes a negative response variable or no response communication is received), Domain 2 System 115b can condition access upon validation of login credentials. For example, Domain 2 System 115b can transmit a login webpage that includes one or more fields to receive login credentials to User Device 105. When the login status is active, Domain 2 System 115a can grant access to webpages (e.g., by transmitting one or more webpage source files from a webpage source file data store 120*b* and/or one or more content objects from a content object data store 125*b*) without requiring User Device 105 to provide login credentials.

When access is granted by Domain 2 System 115*b*, Domain 2 System 115*b* can generate one or more new or updated cookies and/or new or updated login information that reflect that User Device 105 is actively logged into Domain 2 System 115*b*. For example, a new session cookie can be generated that includes a new session identifier and/or that identifies a new site. As another example, a new domain or site cookie can be generated that identifies a domain or site associated with Domain 2 System (e.g., the second system). As yet another example, login information can be stored in login state data store 242*b* that indicates that User Device 105 is actively logged into Distributed Authentication System 245 (and/or Domain 2 System 115*b*). The one or more new or updated cookies can be transmitted to User Device 105 (which can store the one or more new or updated cookies in cookie data store 130). Further, the one or more new or updated cookies can be stored in cookies data store 240*b*. The stored cookie data can be used to respond to a query from another domain system requesting login-status information.

While FIG. 2 shows the login-assessment as involving two domain systems, in some instances, the one or more of the systems need not host webpages and/or may merely host one or more login pages. For example, a system may generally operate as described for Domain 1 System but may serve as a portal that coordinates initial credential collection and validation (e.g., via a Signon dialog). Upon a valid sign on, the one or more cookies may be generated, transmitted to the user device and stored as described in relation to FIG. 2. Further, the user may be then be automatically routed or rerouted in response to user input to a web site hosted by Domain 2 System 115*b*, which can communicate with the portal system to determine that the login status is active.

Thus, the distributed system depicted in FIG. 2 includes two data stores that are maintained separately by separate systems. However, various cookies are used to track a single user throughout interactions with different systems. Rather than terminating use of a cookie (and preventing subsequent automatic login) when a user device logs out of a given system, inter-system communication that indicates that a user device is requesting access to another system in an ecosystem can extend the effective life of the cookie's utility. Thus, a new login need not be required even if a user device logs out of a first system (e.g., when a log out is preempted by an automatic login at a second domain system in an ecosystem). Meanwhile, logging out of a domain system (e.g., via an automated log out in response to a time expiration or other event or a user-initiated log out) before requesting accessing another domain system in an ecosystem can prevent a user device from automatically being signed into the other domain system. Thus, an ecosystem-level single sign-on functionality can be provided where security is preserved, while redundant user-side and server-side login actions are reduced.

Figure 3:
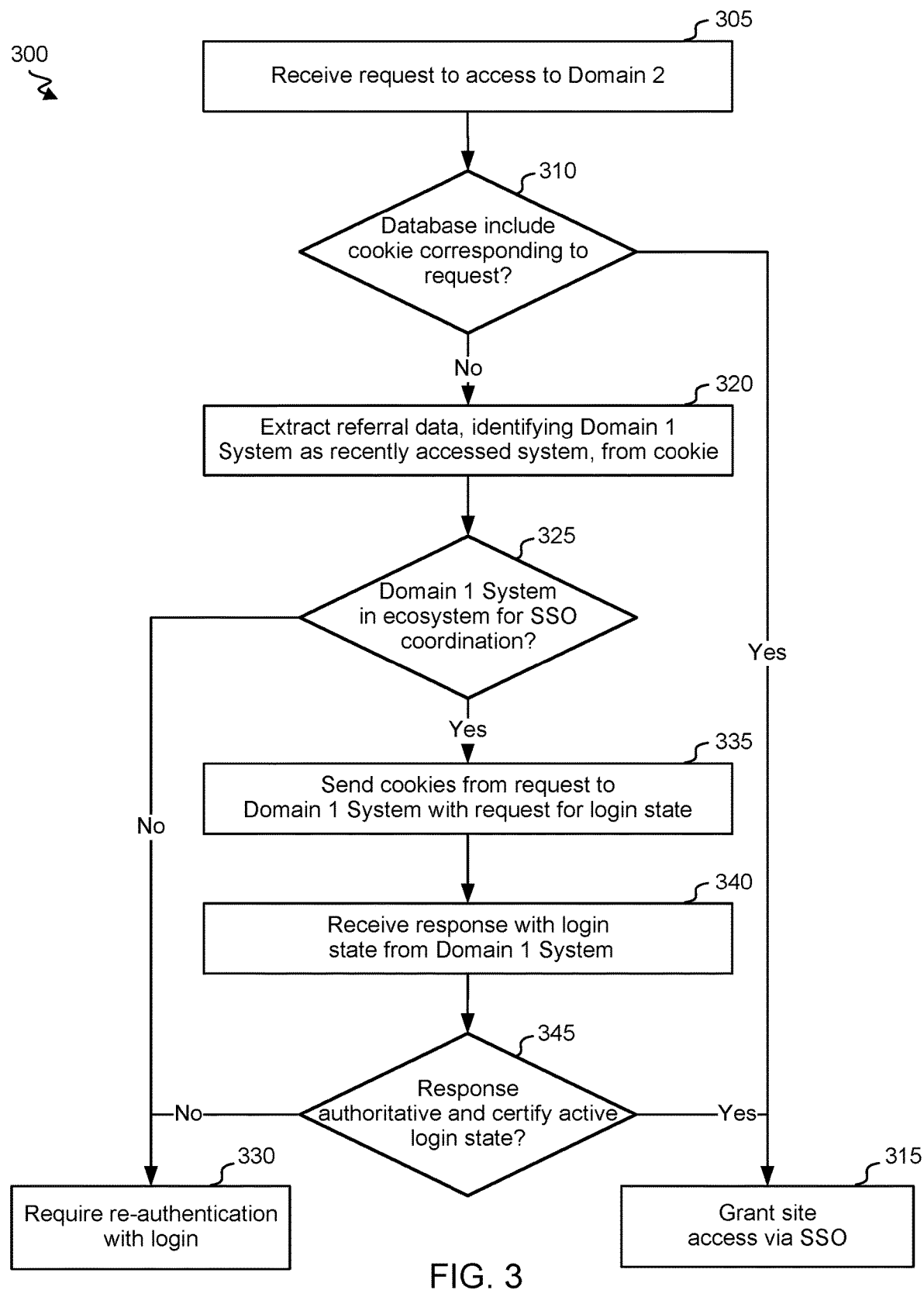
FIG. 3 shows a process for conditionally granting site access according to some embodiments.

FIG. 3 shows a process 300 for conditionally granting site access according to some embodiments. All or part of process 300 may be performed at Domain 2 System 115*b* in the embodiment disclosed in relation to FIG. 2. At block 305, a request is received that corresponds to a request to access Domain 2. The request can include an HTTP request. The request can be received from a user device. The request can include one or more cookies, such as a token cookie that identifies a user device or user, a session cookie that identifies a session and/or a last-visited cookie that identifies a previously accessed web site or domain.

At block 310, it is determined whether a locally managed and/or locally accessible database (e.g., storing cookie data) includes cookie data corresponding to the request. For example, block 310 can include querying a cookie data store to determine whether it includes a token cookie that was included in the request. In some instances, the presence of matching cookie data indicates that a login status at a Domain 2 system is active. In some instances, a further action is performed based on retrieved matching cookie data to determine whether a login status is active.

When it is determined that the request corresponds to an active login status (e.g., by retrieving matching cookie data), process 300 proceeds to block 315, where access to Domain 2 content is granted via a distributed single sign-on process. Thus, credentials need not be provided by the user device and verified.

When it is determined that the request does not correspond to an active login status, process 300 proceeds to block 320, where referral data is extracted from the one or more cookies (e.g., a last-visited cookie) from the request. The referral data identifies a Domain 1 System as having been recently accessed. For example, the referral data may include a URI, a domain, a system address or other identifier that corresponds to the Domain 1 System.

At block 325, it is determined whether the Domain 1 System is in an ecosystem with the Domain 2 System for single sign-on coordination. For example, block 325 can include determining whether all or part of the referral data matches data on a white list (e.g., of domains, URIs, system identifiers, etc.).

If it is determined that the Domain 1 System is not in the ecosystem, process 300 proceeds to block 330, where reauthentication is required. For example, webpage data for a login page may be returned to the user device, such that login credentials may be required. As another example, a public logon may be performed.

If it is determined that the Domain 1 System is in the ecosystem, process 300 proceeds to block 335 where at least one of the one or more cookies from the request are transmitted to the Domain 1 System with a request for a corresponding login state. The at least one of the one or more cookies can include (for example) the token cookie and the session cookie. The request can include a command to query a data store for corresponding token- and/or session-cookie data.

At block 340, a response from Domain 1 System is received. The response may be indicative of a login state. For example, the response may indicate that the cookie(s) correspond to an active login status. As another example, the response may indicate that the cookie(s) correspond to an inactive login status (e.g., as a result of an expiration or express logout event). The response may be indicative as to whether the Domain 1 System is authoritative in providing a login status. For example, the response may indicate that no corresponding data is identifiable, that the system is not available, etc.

At block 345, it is determined whether the response indicates that the Domain 1 System is authoritative and that the one or more cookies correspond with an active login state at a domain managed by the Domain 1 System. If it is determined that the Domain 1 System is authoritative and that the one or more cookies correspond with an active login state, process 300 proceeds to block 315, and access to the site managed by the Domain 2 System is granted without requiring login validation. If it is determined that the Domain 1 System is not authoritative or (or and) that the one or more cookies do not correspond with an active login state, process 300 proceeds to block 330, and access to the site managed by the Domain 2 System is conditioned upon subsequent valid login.

It will be appreciated that, in some instances, additional factors and/or conditions may be in effect beyond those shown in FIG. 3. For example, even if (at block 345) it is determined that the Domain 1 System is authoritative and that the one or more cookies correspond with an active login state, satisfaction of one or more additional conditions may be required before access is granted.

In some instances, rather than granting access at block 315, a single sign-on process is performed using at least one of the one or more cookies. For example, the token cookie may be used for the single sign-on. Thus, in this instance, a same token cookie can be used to access multiple domains. It will be appreciated that, in some instances, a new token cookie may instead be automatically generated by the Domain 2 System (e.g., even if access is granted).

Figure 4:
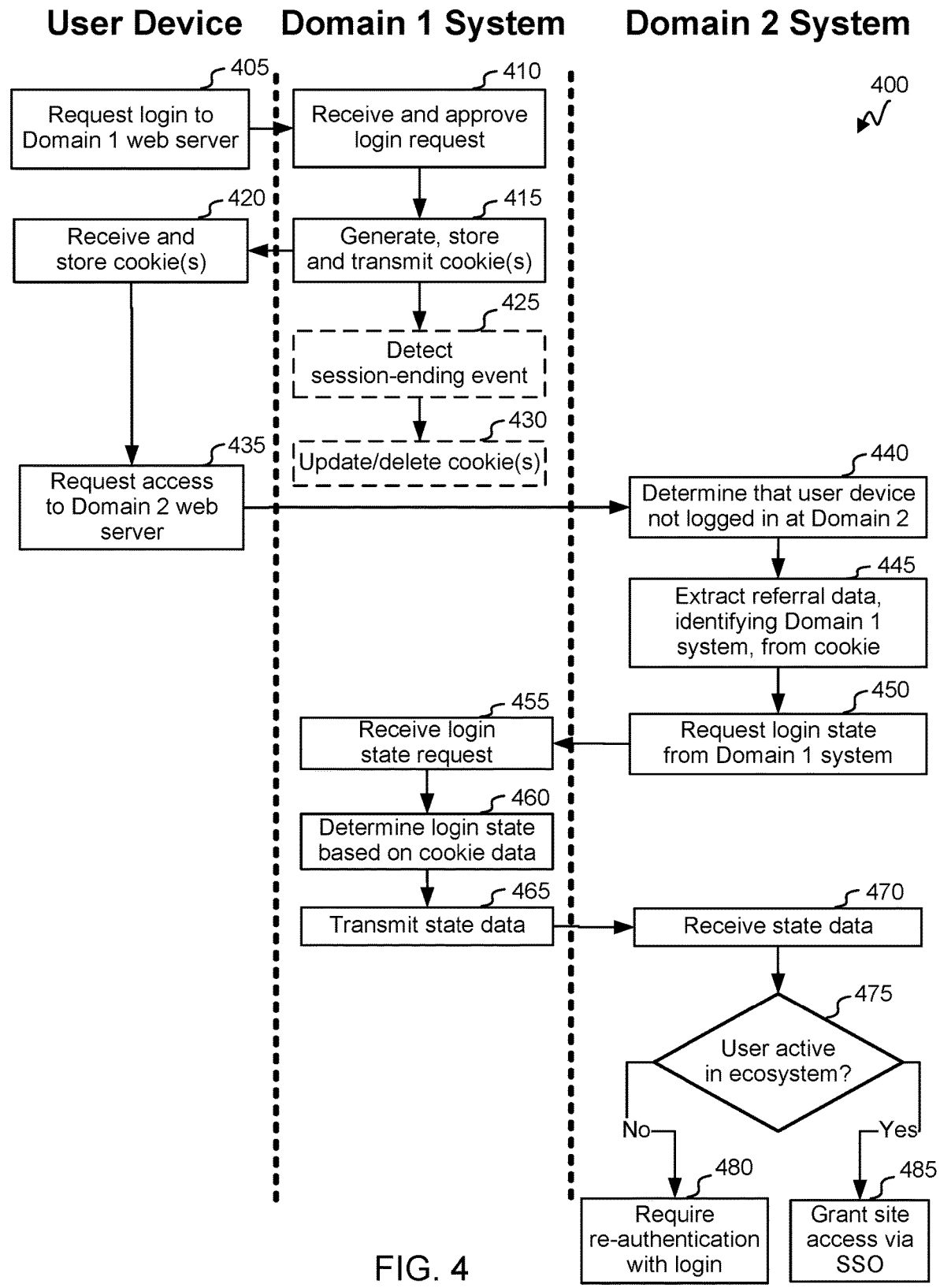
FIG. 4 shows a flow diagram for a process for conditionally granting site access according to some embodiments.

FIG. 4 shows a flow diagram for a process 400 for conditionally granting site access according to some embodiments. At block 405, a user device transmits a request to access content at a Domain 1 web server. The request may include an HTTP request. The request may include login credentials (e.g., a username and password). The request may include a URI for a webpage on a domain hosted by the Domain 1 web server.

At block 410, a Domain 1 System that includes the Domain 1 web server receives the request and approves the login request. For example, the Domain 1 System may determine that credentials provided in the request match a set of credentials stored in a credentials data store. As another example, the Domain 1 System may perform a public login.

At block 415, the Domain 1 System generates and stores one or more cookies. The Domain 1 System also transmits the one or more cookies to the user device, which receives and stores the one or more cookies at block 420. The one or more cookies can include a token cookie, which includes one or more identifiers identifying the user device, a browser having generated the request received at block 410 and/or a user of the user device. In some instances, the presence of the token cookie at the Domain 1 System is indicative of the user device (and/or the browser at the user device) having a currently active login status with the Domain 1 System. The one or more cookies may further include a session cookie that includes a session identifier. The one or more cookies may include a domain or site cookie that includes access data (e.g., an identifier of a domain, URI, web site and/or webpage associated with the Domain 1 System and having been accessed). The one or more cookies may be associated with an expiration time or duration and configured to be deleted upon the expiration time or duration.

Optionally, at block 425 the Domain 1 System detects a session-ending event. The session-ending event can include (for example) a communication from the user device that is indicative of the user device logging out of the domain. The session-ending event can include reaching an expiration time and/or an end of an expiration duration. In response to detecting the session-ending event, the Domain 1 System updates or deletes the one or more cookies at block 430. The update or deletion can be performed to indicate that the user device is no longer actively logged into the domain associated with the Domain 1 System.

It will be appreciated that other types of events may also be detected, such as requests for one or more webpages at the domain associated with the Domain 1 System. Domain 1 System may respond to each request by transmitting the requested content. Depending on the embodiment, for each of at least one (or all) of the one or more cookies, an updated cookie may further be transmitted to the user device and stored at the Domain 1 System and user device. This cookie updating may (for example) facilitate extending an expiration time when a user device is actively interacting with a web site.

At block 435, the user device transmits a request to access content at a Domain 2 web server. The request may include an HTTP request. The request may include a URI for a webpage on a domain hosted by the Domain 2 web server. The request may include the one or more cookies.

At block 440, a Domain 2 System (that includes the Domain 2 web server) determines that the user device is not logged in at a second domain hosted by the Domain 2 system. For example, the Domain 2 System may query a locally managed and/or locally accessible data store to determine whether it includes cookie data corresponding to a token cookie and/or session cookie included in the request.

At block 445, the Domain 2 System then extracts referral data from the one or more cookies. For example, the referral data may be extracted from access data in the domain or site cookie. The referral data may identify the Domain 1 System as having been recently visited. In some instances, an ecosystem of domain systems is configured such that the domain or site cookie is to be replaced with a new domain or site cookie each time the user device accesses a domain hosted by a system in the ecosystem or each time the user device initiates a new session with a domain hosted by a system (e.g., such that subsequent requests sent to a same domain new system do not result in a cookie replacement). Thus, a user device may access a first domain in an ecosystem, proceed to access another domain not in the ecosystem, and then access a second domain in an ecosystem, and—if the cookies associated with the first-domain access have not expired, the referral data will identify a first-domain system as being recently accessed, not the other domain.

At block 450, the Domain 2 System transmits a request for a login state for the user device to the Domain 1 System, which receives the request at block 455. The request can include at least one (or all) of the one or more cookies (e.g., a token cookie and/or a session cookie).

At block 460, the Domain 1 System determines the login state for the user data based on cookie data. For example, the Domain 1 System may query a locally managed and/or locally accessible cookie data store to determine whether the cookie data store includes cookie data matching or corresponding to data in the token cookie and/or session cookie. If no matching or corresponding cookie data is found, the Domain 1 System may identify the login state as being negative or not logged in. If matching or corresponding cookie data is found, in some instances, the mere match or correspondence may result in Domain 1 System identifying the login state as being positive or actively logged in (e.g., if cookie data is deleted upon expiration or occurrence of a session-ending event). In some instances, matching or corresponding cookie data is assessed to determine whether it is associated with an active login state.

At block 465, the Domain 1 System transmits the determined login state data to the Domain 2 System, which receives the state data at block 470. The login state data may include (for example) an indication as to whether the user device is associated with an active login at the Domain 1

System and/or the cookie data. The Domain 1 System may further include a signature and/or shared secret to indicate that the Domain 1 System is part of an ecosystem for coordinated single sign-on processing.

At block 475, the Domain 2 System determines, based on the state data, whether the user device is associated with an active login in an ecosystem for coordinated single sign-on processing (that includes the Domain 1 System and the Domain 2 System). For example, if the state data received from Domain 1 System is indicative of an active login and the Domain 1 System response is validated (e.g., by validating a signature and/or shared secret), it may be determined that the user device is associated with an active login in the ecosystem. Meanwhile, it may be determined that the user device is not associated with an active login in the ecosystem if the state data is not indicative of an active login, the Domain 1 System signature or shared secret is not validated, etc.

When it is determined that the user device is not associated with an active login in the ecosystem, process 400 proceeds to block 480, where re-authentication is required via a login. The login may include (for example) a public login or a credential-based login. Thus, access to content from the second domain can be restricted or prevented until the login is successfully completed.

When it is determined that the user device is associated with an active login in the ecosystem, process 400 proceeds to block 485, where access to content on the second domain is granted. The access is thus provided via an ecosystem-wide single sign-on process. Granting access can include transmitting data (e.g., a source file and/or content objects) for one or more webpages (e.g., a landing page or page identified in the request received at block 440) to the user device.

Thus, when a user device is associated with an active login at Domain 1 System, the user device can seamlessly transition to accessing content hosted by the Domain 2 System. This seamless access can be provided even when no central cookie-management/authentication server is used to globally manage cookies across domains. Rather, individual domains can locally manage cookie data and targeted communications can facilitate coordinated single sign-on processing occurring at an ecosystem level.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method comprising: receiving, at a first domain system from a user device, a first communication corresponding to a first request to access a first domain hosted on a first web server, the first communication including one or more cookies comprising access data, the one or more cookies received from a second domain system that was previously accessed, wherein the second domain system is hosted on a second web server that is separate from the first web server;
- extracting the access data from the one or more cookies, the access data identifying the second domain system, each of the first domain system and the second domain system being within a distributed system having separate data stores, the second domain system hosting one or more first gated webpages on a second domain, and the first domain system hosting one or more second gated webpages on the first domain;
- comparing the access data from the one or more cookies with a white list of domains to determine that the first domain system and the second domain are within an ecosystem for single sign-on coordination;
- upon determining that the first domain system is in the ecosystem:
- transmitting, from the first domain system and to the second domain system, a second communication corresponding to a second request for login state data that indicates whether the one or more cookies corresponds to an active login state at the second domain, the second communication including at least part of the one or more cookies;
- receiving, at the first domain system and from the second domain system, particular login state data that indicates that the one or more cookies corresponds to the active login state at the second domain;
- in response to receiving the particular login state data, authorizing the user device to access a webpage of the one or more second gated webpages on the first domain;
- and updating the one or more cookies by updating the access data of the one or more cookies to identify the first domain system in place of the second domain system; storing the updated one or more cookies; and transmitting the updated one or more cookies to the user device.

2. The method of claim 1, wherein the one or more cookies includes a plurality of cookies, and wherein updating the one or more cookies includes updating a particular cookie of the plurality of cookies.

3. The method of claim 1, wherein the updated one or more cookies is configured to expire at an expiration time, and wherein the method further includes:
- receiving, from the user device, a third communication that corresponds to a third request for content at a webpage of the one or more second gated webpages;
- generating a new version of the one or more cookies configured to expire at a time later than the expiration time;
- storing the new version of the one or more cookies; and
- transmitting, to the user device, the new version of the one or more cookies and the content.

4. The method of claim 1, further comprising:
- generating a new version of the one or more cookies to reflect an interaction or lack thereof between the user device and the first domain;
- receiving, from a third domain system that hosts one or most third webpages on a third domain, a third communication corresponding to a third request for login state data that indicates whether the one or more cookies corresponds to an active login state at the first domain;
- determining that the new version of the one or more cookies applies to the third request;
- generating, based on the new version of the one or more cookies, second particular login state data that indicates whether the new version of the one or more cookies corresponds to an active login state at the first domain; and
- transmitting the second particular login state data to the third domain system.

5. The method of claim 4, further comprising, in response to determining that the new version of the one or more cookies applies to the third request:
- extracting, from the new version of the one or more cookies, expiration data; and
- determining, based on the expiration data, that the new version of the one or more cookies is expired, wherein the second particular login state data indicates that the new version of the one or more cookies does not correspond to an active login state at the first domain.

6. The method of claim 1, further comprising:
- receiving, at the first domain system and from a second user device, a third communication corresponding to a third request to access the first domain, the third communication including another one or more cookies;
- extracting other access data from the other one or more cookies, the other access data identifying the second domain system;
- transmitting, from the first domain system and to the second domain system, a fourth communication corresponding to a fourth request for login state data that indicates whether the other one or more cookies corresponds to an active login at the other domain, the fourth communication including at least part of the other one or more cookies;
- receiving, at the first domain system and from the second domain system, other particular login state data that indicates that the other one or more cookies does not correspond to an active login state at the other domain; and
- in response to receiving the other particular login state data, transmitting, to the user device, data for a webpage that includes one or more login fields, wherein granting the second user device access to the one or more second gated webpages is conditioned upon receiving valid login information from the second user device.

7. A computer-program product tangibly embodied in a non-transitory machine-readable storage medium, including instructions configured to cause one or more data processor to perform actions including:
- receiving, at a first domain system from a user device, a first communication corresponding to a first request to access a first domain hosted on a first web server, the first communication including one or more cookies comprising access data, the one or more cookies received from a second domain system that was previously accessed, wherein the second domain system is hosted on a second web server that is separate from the first web server;
- extracting the access data from the one or more cookies, the access data identifying the second domain system, each of the first domain system and the second domain system being within a distributed system having separate data stores, the second domain system hosting one or more first gated webpages on a second domain, and the first domain system hosting one or more second gated webpages on the first domain;
- comparing the access data from the one or more cookies with a white list of domains to determine that the first domain system and the second domain are within an ecosystem for single sign-on coordination;

upon determining that the first domain system is in the ecosystem:

transmitting, from the first domain system and to the second domain system, a second communication corresponding to a second request for login state data that indicates whether the one or more cookies corresponds to an active login state at the second domain, the second communication including at least part of the one or more cookies;

receiving, at the first domain system and from the second domain system, particular login state data that indicates that the one or more cookies corresponds to the active login state at the second domain;

in response to receiving the particular login state data, authorizing the user device to access a webpage of the one or more second gated webpages on the first domain;

and updating the one or more cookies by updating the access data of the one or more cookies to identify the first domain system in place of the second domain system; storing the updated one or more cookies; and transmitting the updated one or more cookies to the user device.

8. The computer-program product of claim 7, wherein the one or more cookies includes a plurality of cookies, and wherein updating the one or more cookies includes updating a particular cookie of the plurality of cookies.

9. The computer-program product of claim 7, wherein the updated one or more cookies is configured to expire at an expiration time, and wherein the actions further include:

receiving, from the user device, a third communication that corresponds to a third request for content at a webpage of the one or more second gated webpages;

generating a new version of the one or more cookies configured to expire at a time later than the expiration time;

storing the new version of the one or more cookies; and transmitting, to the user device, the new version of the one or more cookies and the content.

10. The computer-program product of claim 7, wherein the actions further include:

generating a new version of the one or more cookies to reflect an interaction or lack thereof between the user device and the first domain;

receiving, from a third domain system that hosts one or most third webpages on a third domain, a third communication corresponding to a third request for login state data that indicates whether the one or more cookies corresponds to an active login state at the first domain;

determining that the new version of the one or more cookies applies to the third request;

generating, based on the new version of the one or more cookies, second particular login state data that indicates whether the new version of the one or more cookies corresponds to an active login state at the first domain; and transmitting the second particular login state data to the third domain system.

11. The computer-program product of claim 10, wherein the actions further include, in response to determining that the new version of the one or more cookies applies to the third request:

extracting, from the new version of the one or more cookies, expiration data; and determining, based on the expiration data, that the new version of the one or more cookies is expired, wherein the second particular login state data indicates that the new version of the one or more cookies does not correspond to an active login state at the first domain.

12. The computer-program product of claim 7, wherein the actions further include:

receiving, at the first domain system and from a second user device, a third communication corresponding to a third request to access the first domain, the third communication including another one or more cookies;

extracting other access data from the other one or more cookies, the other access data identifying the second domain system;

transmitting, from the first domain system and to the second domain system, a fourth communication corresponding to a fourth request for login state data that indicates whether the other one or more cookies corresponds to an active login at the other domain, the fourth communication including at least part of the other one or more cookies;

receiving, at the first domain system and from the second domain system, other particular login state data that indicates that the other one or more cookies does not correspond to an active login state at the other domain; and in response to receiving the other particular login state data, transmitting, to the user device, data for a webpage that includes one or more login fields, wherein granting the second user device access to the one or more second gated webpages is conditioned upon receiving valid login information from the second user device.

13. A domain system comprising: one or more data processors; and a non-transitory computer readable storage medium containing instructions which when executed on the one or more data processors, cause the one or more data processors to perform actions including:

receiving, at a first domain system from a user device, a first communication corresponding to a first request to access a first domain hosted on a first web server, the first communication including one or more cookies comprising access data, the one or more cookies received from a second domain system that was previously accessed, wherein the second domain system is hosted on a second web server that is separate from the first web server;

extracting the access data from the one or more cookies, the access data identifying the second domain system, each of the first domain system and the second domain system being within a distributed system having separate data stores, the second domain system hosting one or more first gated webpages on a second domain, and the first domain system hosting one or more second gated webpages on the first domain;

comparing the access data from the one or more cookies with a white list of domains to determine that the first domain system and the second domain are within an ecosystem for single sign-on coordination;

upon determining that the first domain system is in the ecosystem:

transmitting, from the first domain system and to the second domain system, a second communication corresponding to a second request for login state data that indicates whether the one or more cookies corresponds to an active login state at the second domain, the second communication including at least part of the one or more cookies;

receiving, at the first domain system and from the second domain system, particular login state data that indicates that the one or more cookies corresponds to the active login state at the second domain;

in response to receiving the particular login state data, authorizing the user device to access a webpage of the one or more second gated webpages on the first domain;

and updating the one or more cookies by updating the access data of the one or more cookies to identify the first domain system in place of the second domain system; storing the updated one or more cookies; and transmitting the updated one or more cookies to the user device.

14. The domain system of claim 13, wherein the one or more cookies includes a plurality of cookies, and wherein updating the one or more cookies includes updating a particular cookie of the plurality of cookies.

15. The domain system of claim 13, wherein the updated one or more cookies is configured to expire at an expiration time, and wherein the actions further include:

receiving, from the user device, a third communication that corresponds to a third request for content at a webpage of the one or more second gated webpages;

generating a new version of the one or more cookies configured to expire at a time later than the expiration time;

storing the new version of the one or more cookies; and transmitting, to the user device, the new version of the one or more cookies and the content.

16. The domain system of claim 13, wherein the actions further include:

generating a new version of the one or more cookies to reflect an interaction or lack thereof between the user device and the first domain;

receiving, from a third domain system that hosts one or most third webpages on a third domain, a third communication corresponding to a third request for login state data that indicates whether the one or more cookies corresponds to an active login state at the first domain;

determining that the new version of the one or more cookies applies to the third request;

generating, based on the new version of the one or more cookies, second particular login state data that indicates whether the new version of the one or more cookies corresponds to an active login state at the first domain; and transmitting the second particular login state data to the third domain system.

17. The domain system of claim 16, wherein the actions further include, in response to determining that the new version of the one or more cookies applies to the third request:

extracting, from the new version of the one or more cookies, expiration data; and determining, based on the expiration data, that the new version of the one or more cookies is expired, wherein the second particular login state data indicates that the new version of the one or more cookies does not correspond to an active login state at the first domain.

* * * * *